United States Patent
Haslett et al.

(10) Patent No.: US 10,837,836 B2
(45) Date of Patent: Nov. 17, 2020

(54) TEMPERATURE SENSOR FOR A HIGH SPEED ROTATING MACHINE

(71) Applicant: Edwards Limited, Burgess Hill (GB)

(72) Inventors: Brent Haslett, Burgess Hill (GB); Andrew Grantham, Burgess Hill (GB); James Alexander Haylock, Burgess Hill (GB)

(73) Assignee: Edwards Limited, Burgess Hill (GB)

( * ) Notice: Subject to any disclaimer, the term of this patent is extended or adjusted under 35 U.S.C. 154(b) by 0 days.

(21) Appl. No.: 16/330,306

(22) PCT Filed: Sep. 6, 2017

(86) PCT No.: PCT/GB2017/052596
§ 371 (c)(1),
(2) Date: Mar. 4, 2019

(87) PCT Pub. No.: WO2018/046913
PCT Pub. Date: Mar. 15, 2018

(65) Prior Publication Data
US 2019/0226914 A1   Jul. 25, 2019

(30) Foreign Application Priority Data
Sep. 6, 2016   (GB) .................... 1615124.3

(51) Int. Cl.
*G01J 5/06*   (2006.01)
*G01J 5/04*   (2006.01)
(Continued)

(52) U.S. Cl.
CPC .............. *G01J 5/061* (2013.01); *F04D 19/04* (2013.01); *F04D 27/001* (2013.01);
(Continued)

(58) Field of Classification Search
CPC ...... F04D 19/04; F04D 19/042; F04D 27/001; G01J 5/0003; G01J 5/0022; G01J 5/0088;
(Continued)

(56) References Cited

U.S. PATENT DOCUMENTS 4,204,120 A   5/1980   Riboulet et al.
4,435,093 A   3/1984   Krause et al.
(Continued)

FOREIGN PATENT DOCUMENTS

CN   1141672 A   1/1997
CN   1244715 A   2/2000
(Continued)

OTHER PUBLICATIONS

British Search Report dated Feb. 15, 2017 and Examination Report dated Feb. 16, 2017 for corresponding British Application No. GB1615124.3.
(Continued)

*Primary Examiner* — Mark R Gaworecki
(74) *Attorney, Agent, or Firm* — Theodore M. Magee; Westman, Champlin & Koehler, P.A.

(57) ABSTRACT

Infra-red sensors are often used in turbo molecular pumps to detect the temperature of the rotor or other mechanical parts and therefore indicate imminent, or potential, running failures. As deposits build up on either the infra-red sensor, or on the surface being monitored, the reading given by the sensor may not be a true representation of the actual surface temperature which can cause the pump controller to fail to stop the pump in time. The present invention provides a method and device for calibrating the sensor by creating a determined temperature rise in the sensor whilst keeping the rotor at ambient temperature. In particular the present invention uses the motor stator as the heater for causing the temperature increase.

25 Claims, 2 Drawing Sheets

(51) Int. Cl.
  *G01J 5/02*    (2006.01)
  *G01J 5/12*    (2006.01)
  *F04D 27/00*   (2006.01)
  *F04D 19/04*   (2006.01)
  *G01N 21/94*   (2006.01)
  *G01J 5/00*    (2006.01)

(52) U.S. Cl.
  CPC .......... *G01J 5/0003* (2013.01); *G01J 5/0022* (2013.01); *G01J 5/026* (2013.01); *G01J 5/041* (2013.01); *G01J 5/12* (2013.01); *G01N 21/94* (2013.01); *G01J 2005/063* (2013.01)

(58) Field of Classification Search
  CPC .. G01J 5/026; G01J 5/041; G01J 5/061; G01J 5/12; G01J 2005/063; G01N 21/94; H02K 11/25
  See application file for complete search history.

(56) References Cited

U.S. PATENT DOCUMENTS

| | | |
|---|---|---|
| 5,350,275 A | 9/1994 | Ishimaru |
| 2003/0185272 A1 | 10/2003 | Miwata et al. |
| 2011/0200460 A1 | 8/2011 | Nonaka et al. |
| 2012/0146563 A1 | 6/2012 | Zettner |
| 2015/0226229 A1 | 8/2015 | Tsutsui |

FOREIGN PATENT DOCUMENTS

| | | |
|---|---|---|
| CN | 2368020 Y | 3/2000 |
| CN | 1471631 A | 1/2004 |
| CN | 1688815 A | 10/2005 |
| CN | 102150769 A | 8/2011 |
| CN | 203837817 U | 9/2014 |
| CN | 105867087 A | 8/2016 |
| EP | 1348940 A2 | 10/2003 |
| JP | H11148487 A | 6/1999 |
| JP | 2005315090 A | 11/2005 |
| JP | 2006017089 A | 1/2006 |
| JP | 2006037739 A | 2/2006 |
| JP | 2013079602 A | 5/2013 |

OTHER PUBLICATIONS

British Search Report dated Apr. 10, 2017 for corresponding British Application No. GB1615124.3.

PCT Notification of Transmittal of the International Search Report and the Written Opinion of the International Searching Authority, or the Declaration dated Jan. 30, 2018, PCT Search Report and Written Opinion dated Jan. 30, 2018 for corresponding PCT Application No. PCT/GB2017/052596.

First Office Action dated Jun. 15, 2020 for corresponding Chinese application U.S. Appl. No. CN201780054785.2.

TEMPERATURE SENSOR FOR A HIGH SPEED ROTATING MACHINE

CROSS-REFERENCE OF RELATED APPLICATION

This application is a Section 371 National Stage Application of International Application No. PCT/GB2017/052596, filed Sep. 6, 2017, and published as WO 2018/046913 A1 on Mar. 15, 2018, the content of which is hereby incorporated by reference in its entirety and which claims priority of British Application No. 1615124.3, filed Sep. 6, 2016.

FIELD

The present invention relates to an infrared sensor system configured to measure the temperature of a rotating machine rotor, in particular a high speed rotating machine rotor such as a turbomolecular vacuum pump rotor and a motor comprising the infrared sensor system. The invention also relates to a method of testing the operational efficacy of an infrared sensor system; and a controller configured to operate said method. The invention further relates to a method of calibrating the emissivity of a surface to be monitored by an infrared sensor, and a controller configured to operate said method.

BACKGROUND

Many rotating machines utilize infrared sensors to detect the temperature of thermally sensitive moving parts. Contacting sensors are difficult to position against the moving parts and so a contactless sensor, such as an infrared sensor is an ideal solution.

Known infrared sensors 2, as illustrated in FIG. 1, usually comprise a thermopile 4, which is a plurality of thermocouples connected in series with the hot junctions 6. i.e. the detecting junctions 6, connected to an infrared absorbing material (absorber) 8, such as a very thin membrane (or window) 8. The small thermal mass of the absorber 8 means that it quickly responds to changes in surface temperature, $T_{OB}$, of the object 101 that is being measured.

The cold junctions 10 of the thermopile 4 are usually located in an isothermal block 12 so that they are all at the same temperature, the reference temperature of the sensor, $T_{REF}$, as measured by a thermistor 18 internal to the sensor.

When an object 101 to be measured is positioned in front of the sensor's IR absorbing surface 8, the IR absorbing surface 8 will undergo either a net gain or net loss of heat in the form of thermal (infrared) radiation depending on whether the absorbing surface 8 is at a higher or lower temperature respectively than that of the object 101 being measured.

As the surface temperature ($T_{OB}$) of the object 101 rises in comparison to the sensor 2, the hot junction 6 will begin to absorb infrared radiation and become hotter than the reference temperature ($T_{REF}$). This causes a voltage to be generated in the thermopile 4 corresponding to the temperature change of the surface of the object ($T_{OB}$). The temperature, $T_{OB}$, measured by the infrared sensor is compensated by the temperature $T_{REF}$, measured by the internal thermistor 18, and an accurate reading of the object surface temperature is obtained.

Turbomolecular pumps are used in many applications where high vacuum, i.e. low pressures, are required. For example, the semiconductor industry uses turbomolecular pumps for many processing steps in order to maintain the low pressures required to increase the yield of low defect devices.

In operation, turbomolecular pump rotors rotate at high rotational speeds. The tolerance, or distance, between the tip of the rotor blade and the inner wall of the pump casing must be as small as possible in order for the pump to achieve the required pumping performance. If the pump operates above a desired temperature the resulting expansion of the rotor blades can be such that a catastrophic failure can occur due to the rotor blades colliding with stationary parts of the internal mechanism, such as the stator blades. Therefore careful control and monitoring of the internal pump temperature is required. This is often achieved using an infrared temperature sensor 2.

Many processing steps utilized by the semiconductor industry produce corrosive and/or condensable by-products that are conveyed away from a processing chamber and through vacuum pump systems including turbomolecular pumps. These processes can coat, or corrode, any temperature sensors employed; or coat the surface of the rotor being monitored thereby modifying the surface emissivity, to the extent that it interferes with, in particular, an infrared sensor's ability to provide accurate readings.

Thus the temperature sensor may fail to detect a dangerous temperature rise within the pump.

It is an object of the present invention to overcome, or at least reduce the effect of, these issues.

SUMMARY

According to the present invention there is provided a method of measuring the initial emissivity. $E_I$, of a surface and comparing it with an expected emissivity, $E_E$, using an infrared temperature sensor system, the system comprising an infrared temperature sensor directed at the surface to be measured and a heater, located proximate to the infrared sensor, for heating the sensor, the method comprising the steps of raising the temperature of the heater to heat the infrared sensor without significantly heating the surface; measuring the voltage generated, $V_G$, by heating the infrared sensor; comparing the voltage generated by the infrared sensor with an expected voltage, $V_E$; and calculating the initial emissivity of the surface, $E_I$, according to the equation $E_I = E_E(V_G/V_E)$.

According to another aspect of the present invention there is provided a method of testing the operational status of an infrared sensor system, the system comprising an infrared sensor; and a heater, located proximate to the infrared sensor, for heating the infrared sensor; said method comprising the steps of directing the infrared sensor at a surface of an object external to the infrared sensor, the surface having an emissivity E; raising the temperature of the heater to heat the infrared sensor without significantly heating the object surface; measuring the voltage generated, $V_G$, by heating the infrared sensor, and comparing the voltage generated by the infrared sensor with an expected voltage, $V_E$.

The method may comprise the additional step of determining that if $V_G$ does not substantially equal $V_E$, the infrared system is not at ideal operational status or, conversely, that if $V_G$ substantially equals $V_E$, the infrared system is at ideal operational status.

The infrared sensor system may be located in a rotating machine and the infrared sensor and directed to measure the thermal radiation emitted from a rotating surface of the rotating machine. The infrared sensor system may be located in a vacuum pump and directed to measure the thermal radiation emitted from a vacuum pump rotor surface, in particular a turbomolecular pump rotor.

The method may be initialised when the pump is at room temperature or the method may be initialized when the pump is at a steady state of operation.

According to a further aspect of the present invention there may be provided a method of testing the operational status of an infrared sensor system, said system comprising an infrared sensor located either proximate to, or integral with, a motor; comprising the steps of directing the infrared sensor at a surface of an object external to the infrared sensor with an emissivity E; applying a DC current to at least one motor winding to raise the temperature of the motor without causing significant rotation of the motor, to heat the infrared sensor without significantly heating the object surface; measuring the voltage generated $V_G$ by the infrared sensor; and comparing the voltage generated by the infrared sensor with an expected voltage $V_E$.

The method may comprise the additional step of determining that if $V_G$ does not substantially equal $V_E$, the infrared system is not at ideal operational status or, conversely, that if $V_G$ substantially equals $V_E$, the infrared system is at ideal operational status.

The infrared sensor system may be located in a rotating machine and the infrared sensor directed to measure the thermal radiation emitted from a rotating surface of the rotating machine. The infrared sensor system and motor may be located in a vacuum pump and directed to measure the thermal radiation emitted from a vacuum pump rotor surface, in particular a turbomolecular pump rotor. The method may be initialized when the pump is at room temperature.

According to a yet further aspect of the present invention there is provided an infrared sensor system for measuring the thermal radiation emitted from the surface of a rotor, the system comprising an infrared sensor and a heater, the heater being located proximate to the infrared sensor, for heating the infrared sensor. The heater, preferably a resistive heater, may be integral with the infrared sensor. A vacuum pump, in particular a turbomolecular pump, comprising the infrared system may be provided, wherein the infrared system is positioned for measuring the thermal radiation emitted from the surface a rotor of said vacuum pump. The surface of the rotor of the vacuum pump may be one of a turbomolecular rotor blade, a turbomolecular stator blade, a rotor shaft and a molecular drag pump rotor.

A motor for rotating a rotor may be provided, the motor comprising the aforementioned infrared system, wherein the infrared sensor may be located proximate to the motor windings and positioned to measure the thermal radiation emitted by a surface of the rotor when in a device comprising said rotor.

The motor windings may be encapsulated in a potting material and the infrared sensor may be mounted in said potting material. The heater may be provided by the motor.

A turbomolecular vacuum pump may be provided, comprising an aforementioned motor, wherein the infrared sensor may be directed to measure the thermal radiation emitted from the surface of at least one of a turbomolecular rotor blade, a turbomolecular stator blade, a rotor shaft and a molecular drag pump rotor. Alternatively, the surface which the infrared sensor is directed at may be a carbon fibre reinforced sleeve.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

In order that the present invention may be well understood, embodiments thereof, which are given by way of example only, will now be described with reference to the accompanying drawings, in which.

DETAILED DESCRIPTION

Figure 2:
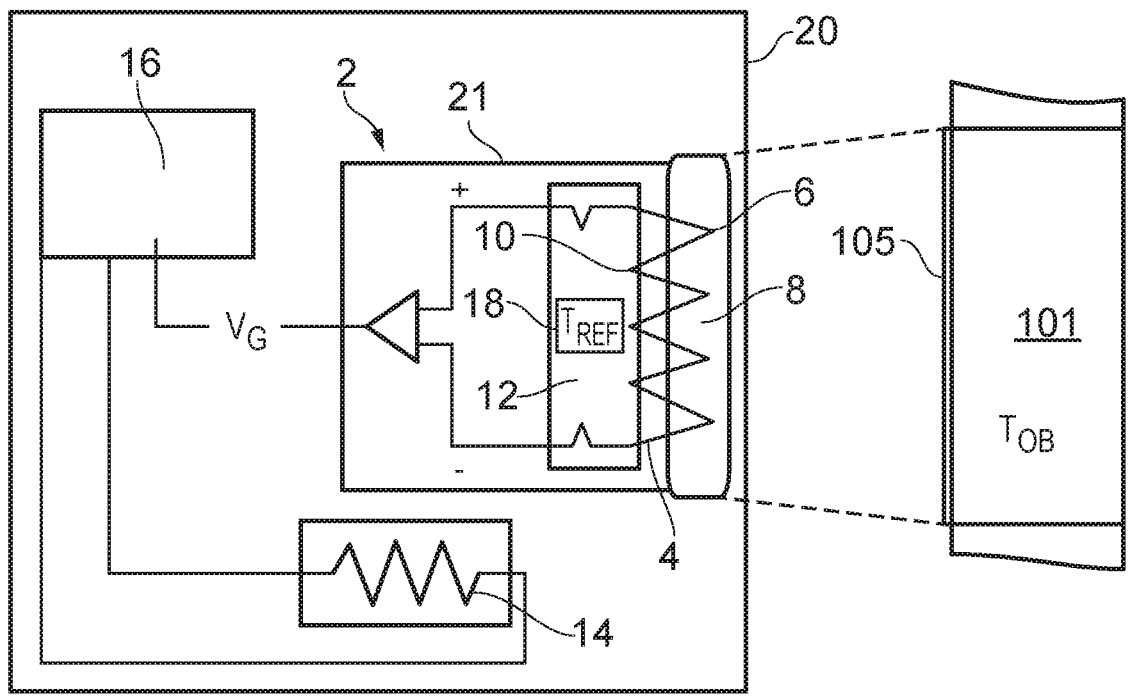
FIG. 2 is a schematic representation of an infrared sensor system according to one aspect of the invention.

Referring first to FIG. 2, a schematic representation of an infrared sensor system 20, according to the present invention, is illustrated.

Figure 1:
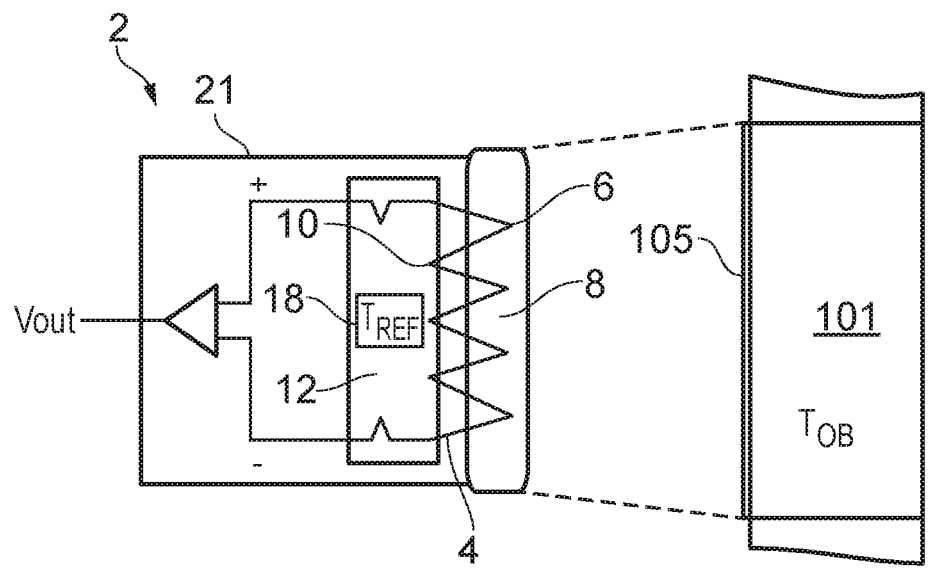
FIG. 1 is a schematic representation of a known infrared sensor.

The sensor system 20 comprises an infrared sensor 2 with substantially the same features as that of a standard infrared sensor 2, as illustrated in FIG. 1 and described above. The sensor system 20 additionally comprises a heater 14, located proximate to the sensor 2, and a controller 16 connected to both the infrared sensor 2 and the heater device 14.

The controller 16 is configured to operate the infrared sensor system 20 according to a method of the invention.

The heater 14 must be located proximate to the infrared sensor 2 such that when the controller 16 operates the heater 14, the heater 14 heats the infrared sensor 2 without substantially heating a surface 105 of the object 101 at which the infrared system is directed. In the example illustrated in FIG. 2, the surface 105 is that of a vacuum pump rotor, object 101. The heater 14 of the sensor system 20 can be separate to, or integral with the infrared sensor 2; it may be any suitable type of heater 14, for example a resistive heater.

In operation, the infrared sensor system controller 16 is able to run an operational status check according to the first aspect, namely a method, of the invention as will now be described.

By this method, the operational status of the infrared sensor system 20 can be determined when the surface 105 of the vacuum pump rotor 101 is either at room temperature, i.e. before the pump (not shown) has been started, or during a steady state operation, when for example the pump is running at operational speed and no gas is passing through an inlet thereof. When the vacuum pump is in one of these two conditional states (off or at steady state), the net exchange of heat between the infrared sensor 2 and rotor surface 105 will be zero because they will each be at substantially the same temperature.

Then, when the heater 14 heats both hot 6 and cold 10 junctions/terminals of the infrared sensor thermopile 4 equally, and the infrared sensor absorber window 8 is clean and free from residue, there will be a net heat loss to the rotor surface 105 as it will now be at a lower temperature than the infrared sensor 2. Thus, a negative voltage $V_G$ will be generated in the thermopile 4 which will match the expected voltage generated $V_E$. Thus the controller 16 will indicate that the operational status of the infrared system 20 is ideal.

By "ideal" we mean that the status of the sensor is such that it is considered to be functioning as expected and that no maintenance thereof is required at the present time.

However, if the sensor absorber window 8 is coated with grease or other debris the rate of heat loss from the window 8 will be lower than expected, due to the insulating effect of the debris and heat reflection back to the thermopile 4. Thus the voltage generated $V_G$ will not substantially equal the expected voltage generated $V_E$ and the controller 16 will, thus, indicate that the operational status is not ideal and that the system 20 requires servicing.

The controller 16 may also be configured to operate the system 20 according to a further aspect of the invention to provide a method of measuring the initial emissivity, $E_I$, of a surface, and comparing this with an expected emissivity $E_E$.

It is particularly advantageous to apply a high emissivity coating to the surface 105 of the rotors 101 which are to have their temperatures measured by infrared sensors 2. High emissivity coatings ensure that accurate temperature readings can be obtained as they ensure that no heat from the infrared sensor 2 is reflected away from the surface 105 and that substantially all thermal radiation generated by the surface of the rotor 101 is directed to the infrared sensor 2. It has been found particularly advantageous to apply a carbon fibre reinforced epoxy sleeve 110 to rotors, such as those of turbomolecular pumps, to overcome issues with loss of coatings over time.

However, if the surface 105 of the coated rotor 101 or a surface 105' of the sleeve 110 becomes coated with grease during initial manufacturing of the pump the initial emissivity, $E_I$, of the coated surface or sleeve will be lower than expected, $E_E$, leading to inaccurate readings for the rest of the pump's operational life.

Therefore, by using the infrared sensor system 20, it is possible to calibrate the initial emissivity $E_I$ of the surface 105, 105' after production, i.e. before use, so that accurate readings can be obtained thereafter. This second method comprises the steps of raising the temperature of the heater 14 to heat the infrared sensor 2 without significantly heating the surface 105, 105'; measuring the voltage generated, $V_G$, by the infrared sensor 2 directed at the surface 105, 105'; comparing the voltage generated, $V_G$, by the infrared sensor 2 with an expected voltage, $V_E$; and calculating the initial 105, $E_I$ according to the equation $E_I=E_E(V_G/V_E)$.

If the emissivity of the surface 105, 105' is found to be as expected then the voltage generated $V_G$ during the test will substantially match that of the expected voltage generated $V_E$. If, however, the emissivity of surface 105, 105' of the coated rotor 101 or the rotor sleeve 110 is not as good as expected, the amount of heat absorbed or reflected by the surface 105, 105' during the test will differ and the voltage generated $V_G$ will be proportionally different. Thus the initial emissivity $E_I$ of the coated surface 105 or the sleeve surface 105' can be calculated. If the emissivity measurement is within a predetermined acceptable range, for example 0.9 to 0.97, then the calculated initial emissivity $E_I$ is used by the controller 16 to calibrate future temperature readings whilst the pump is operational. If the initial emissivity measured falls outside the predetermined acceptable range, the pump will need to be serviced and the sleeve 110 replaced or coating replenished.

Figure 3:
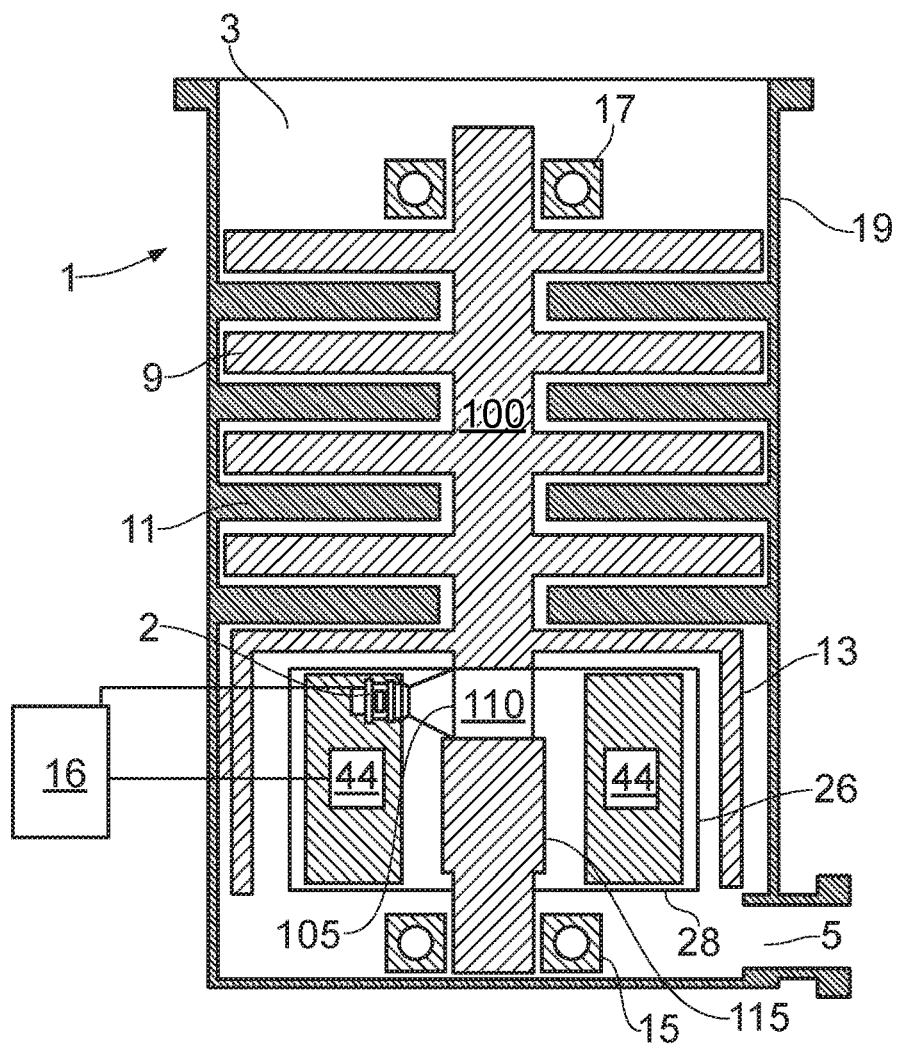
FIG. 3 is a cross section of turbomolecular pump comprising an infrared sensor system according to an aspect of the present invention.
Figure 4:
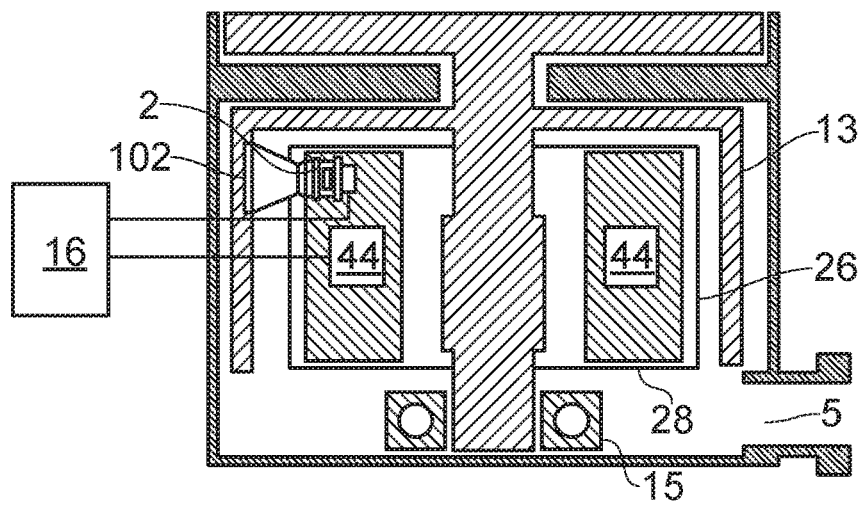
FIG. 4 is partial cross section of turbomolecular pump comprising an infrared sensor system according to a further aspect of the present invention.

Referring now to FIGS. 3 and 4, a cross section of a turbomolecular pump 1, comprising a motor 26 according to a further aspect of the present invention, is illustrated. The pump 1 comprises a housing or casing 19 with an inlet 3 for receiving gas and an outlet 5 for exhausting the gas conveyed through the pump 1, in use.

Within the casing 19 there is provided a rotor 100, which comprises a number of radially outwardly extending rotor blade stages 9. The casing 19 defines a stator component comprising a series of stator blade stages 11 extending radially inwardly and located between each of the rotor blade stages 9 in a manner well known to those skilled in the art of turbomolecular pump design. The rotor 100 also comprises, proximate to the outlet 5, a series of molecular drag, or Holweck, stages 13 which lower the inlet pressure requirements of the pump backing the turbomolecular pump.

In this embodiment, the rotor 100 is supported for rotation at its uppermost and lowermost (as illustrated) ends with bearings 17 and 15 respectively. The lowermost bearings 15 comprise a ball type bearing arrangement and the uppermost bearings 17 comprise a passive magnetic bearing arrangement. The uppermost part of the rotor may also be protected by a set of ball type, thrust bearings (not shown) to prevent the rotor from colliding with the stationary parts of the pump in the event of a failure of the passive magnetic bearings 17.

The rotor 100 is connected to a motor 26. In the example shown the motor 26 is a synchronous two-pole, three-phase brushless 24 Volt DC motor contained in a stator 28. The motor 26 comprises three sets of motor coil windings 44 that are evenly distributed around the motor stator 28. The motor coil windings 44 are contained in a potting material, such as an epoxy resin with good thermal conductivity. A motor shaft 115 is connected to the rotor 100 for rotation thereof.

In normal use, commutation of the motor shaft 115 is controlled using an external controller 16 which, depending on the location of the poles of the magnets, turns on each of the three motor windings 44 in sequence to rotate the motor shaft 115 and thus the pump rotor 100.

The motor 26 also comprises an integral infrared sensor system 20 comprising an infrared sensor 2. The sensor is shown as being contained within the potting material of the coil winding 44, but may also be located in and/or on the motor stator housing 28. The infrared sensor 2 is, as described above, a non-contacting surface temperature measuring sensor comprising a thermopile 4 for measuring the surface temperature $T_{OB}$ of an object device 101 (in this example rotor 100) by monitoring its infrared radiation emissions and a thermistor 18 for monitoring the temperature $T_{REF}$ of a casing 21 of the infrared sensor 2 for the purposes of temperature compensation.

In normal use, the infrared sensor 2 monitors the infrared radiation emitted from a target area 105, on the rotor 100, as shown in FIG. 3 (or 102 in FIG. 4). The temperature $T_{OB}$ measured by the infrared sensor is compensated by an internal thermistor temperature $T_{REF}$ and an accurate reading of the temperature of the rotor surface 105 is obtained. During normal use of the turbomolecular pump 1, if the gas load being pumped or the backing pressure at the outlet 5 remains above the levels for which the pump is designed, the rotor temperature will rise. The infrared sensor 2 passes a signal to the controller 16 indicative of the object rotor temperature $T_{OB}$ and, if above a predetermined temperature, an alarm is raised and/or the pump is slowed down to prevent damage or pump failure.

In order to improve the rotor temperature reading obtained by the infrared sensor 2, the target scanning area 105, 102 on the rotor may have a high emissivity coating applied, such as described in U.S. Pat. No. 5,350,275, or preferably a carbon fibre reinforced epoxy sleeve 110. The target scanning area is ideally on the rotor shaft 115, but it is also suitable to position the infrared sensor in the motor such that the object target surface 102 for the infrared sensor is a stator blade 11 or drag pump mechanism 13 (as illustrated in FIG. 4).

Previously attempted locations for the infrared sensor 2 have been within the pump casing 19, or embedded in the base portion of the pump as disclosed in EP1348940. However, these sensors were affected by corrosion and/or process deposition thus these configurations proved unable to provide consistently reliable temperature measurements.

The embodiments illustrated in FIGS. 3 and 4 provide a further advantage over the infrared system 20 described above, by providing a motor 26 with an integral infrared sensor 2, a device in which the operational status of the sensor 2 can be checked and tested is provided. In these examples, it is the motor 26 which acts as the heater device 14 and the method comprises the steps of applying a direct current to at least one motor winding to raise the temperature of the motor without causing significant rotation of the motor. Thus the infrared sensor 2 may be heated without significantly heating the object surface 105. The voltage generated $V_G$ by the infrared sensor 2 directed at the surface may then be measured and compared with an expected generated voltage $V_E$.

The operational status of the sensor 2 inside the pump 1 is preferably tested/initialized while the pump 1 is at room temperature. The pump controller 16, or an operative, first passes a direct current through at least one of the motor coil windings 44, preferably at a higher current than the usual operating current of the coil windings 44, until a predetermined temperature rise is measured by the sensor's internal thermistor 18. Passing a current through at least one of the motor coil windings 44, or any number of them simultaneously means that the pump windings themselves heat up but the rotor 100, without a commutation signal, does not rotate. Some minor rotation might initially occur, but it will be substantially lower than the rated rotational frequency of the pump 1. Without the commutation signal the pump 1 is unable to rotate at full speed and thus no, or little, heat is generated in the rotor 100 due to gas compression.

By heating the motor 26 to a predetermined temperature, the sensor 2 and controller 16 should detect a difference between the motor 26 and sensor 2 internal reference temperature $T_{REF}$ and the object rotor 101 surface temperature $T_{OB}$ that would not normally be present at room temperature. If the sensor's operational efficacy has not been affected by process by-products the $T_{REF}$ should be greater than $T_{OB}$ by a known value; that is, the voltage generated by the sensor $V_G$ should not differ from the expected generated voltage $V_E$. If, however, the sensor is coated or has been corroded in any way, or the rotor surface 105 has been coated such that its emissivity has been altered then the sensor 2 will not be able to measure the rotor surface temperature accurately so the voltages $V_G$ generated (i.e. the temperature difference measured) will differ from the expected generated voltage $V_E$.

The predetermined temperature rise can be achieved by either passing the direct current through at least one of the motor windings for a set period of time, as described above, or until the sensor's thermistor 18 detects that a predetermined temperature rise has been achieved.

For example, in tests, passing a current of 15 Amps through two motor windings coils provides a temperature rise from 25° C. to 35° C. in 3 minutes. If the temperature rise measured is not as expected, for example the above described temperature rise of at least 10° C., the operator, or controller 16 will determine that the infrared sensor 2, or emissivity of the surface 105 are providing an non-ideal reading, and generate an alarm signal to service the pump.

During production, when it is known that the sensor is operating correctly, an unexpected rise in object temperature $T_{OB}$ can be attributed to a lower than expected emissivity from the target surface 105, 102. In this instance, the unexpected rise allows the true emissivity of the rotor surface to be calculated, affecting calibration of the IR sensor system 20 once the pump 1 is fully assembled.

It is of course possible, according to another aspect of the invention, to provide a turbomolecular pump 1 comprising the sensor system 20 comprising the infrared sensor 2 and a proximate heating device 14 which can also be operated as described above.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A method of measuring an initial emissivity, $E_I$, of a surface and comparing it with an expected emissivity, $E_E$, using an infrared temperature sensor system, the system comprising an infrared temperature sensor directed at the surface to be measured and a heater, located proximate to the infrared sensor, for heating the sensor, the method comprising the steps of:
   raising the temperature of the heater to heat the infrared sensor;
   measuring the voltage generated, $V_G$, by heating the infrared sensor;
   comparing the voltage generated by the infrared sensor with an expected voltage, $V_E$; and
   calculating the initial emissivity of the surface, $E_I$, according to the equation $E_I=E_E(V_G/V_E)$.

2. A method of testing the operational status of an infrared sensor system, the system comprising an infrared sensor; and a heater, located proximate to the infrared sensor, for heating the infrared sensor; said method comprising the steps of:
   directing the infrared sensor at a surface of an object external to the infrared sensor, the surface having an emissivity E;
   raising the temperature of the heater to heat the infrared sensor;
   measuring the voltage generated, $V_G$, by heating the infrared sensor; and
   comparing the voltage generated by the infrared sensor with an expected voltage, $V_E$.

3. The method of testing the operational status of an infrared sensor system according to claim 2; wherein said method comprises the additional step of:
   determining that $V_G$ is not equal to $V_E$ and in response determining that the infrared system is not at ideal operational status.

4. The method of testing the operational status of an infrared sensor system according to claim 2; wherein said method comprises the additional step of:
   determining that $V_G$ equals $V_E$ and in response determining that the infrared system is at ideal operational status.

5. The method of testing the operational status of an infrared sensor system according to claim 2; wherein said infrared sensor system is located in a rotating machine and the infrared sensor is directed to measure the thermal radiation emitted from the rotating surface of the rotating machine.

6. The method of testing the operational status of an infrared sensor system according to claim 2; wherein said infrared sensor system is located in a vacuum pump and directed to measure the thermal radiation emitted from a vacuum pump rotor surface.

7. The method of testing the operational status of an infrared sensor system according to claim 6; wherein said method is initialized when the pump is at room temperature.

8. The method of testing the operational status of an infrared sensor system according to claim 6; wherein said method is initialized when the pump is at a steady state of operation.

9. A method of testing the operational status of an infrared sensor system, said system comprising an infrared sensor located either proximate to, or integral with, a motor; comprising the steps of:
   directing the infrared sensor at a surface of an object external to the infrared sensor with an emissivity E;
   applying a DC current to at least one motor winding to raise the temperature of the motor without causing rotation of the motor sufficient to heat the object surface;
   measuring the voltage generated $V_G$ by the infrared sensor; and
   comparing the voltage generated by the infrared sensor with an expected voltage $V_E$.

10. The method of testing the operational status of an infrared sensor system according to claim 9; wherein said method comprises the additional step of:
    determining that $V_G$ is not equal to $V_E$ and in response determining that the infrared system is not at ideal operational status.

11. The method of testing the operational status of an infrared sensor system according to claim 9; wherein said method comprises the additional step of:
    determining that $V_G$ equals $V_E$, and in response determining that the infrared system is at ideal operational status.

12. The method of testing the operational status of an infrared sensor system according to claim 9; wherein said infrared sensor system and motor are located in a rotating machine and the infrared sensor is directed to measure the thermal radiation emitted from the rotating surface of the rotating machine.

13. The method of testing the operational status of an infrared sensor system comprising an infrared sensor located either proximate to, or integral with, a motor according to claim 9; wherein said infrared sensor system and motor are located in a vacuum pump and directed to measure the thermal radiation emitted from a vacuum pump rotor surface.

14. The method of testing the operational status of an infrared sensor system comprising an infrared sensor located either proximate to, or integral with, a motor according to claim 13; wherein said method is initialized when the pump is at room temperature.

15. A turbomolecular pump comprising:
    an infrared sensor system for measuring the thermal radiation emitted from the surface of a rotor, comprising an infrared sensor and a heater, located proximate to the infrared sensor, for heating the infrared sensor.

16. The turbomolecular pump according to claim 15, wherein the heater is integral with the infrared sensor.

17. The turbomolecular pump according to claim 15, wherein the heater is a resistive heater.

18. A turbomolecular pump according to claim 15 wherein the surface of the rotor comprises a surface of at least one of a turbomolecular rotor blade, a rotor shaft and a molecular drag pump rotor.

19. The turbomolecular pump according to claim 15 further comprising motor windings for rotating the rotor, wherein the infrared sensor is located proximate to the motor windings.

20. The turbomolecular pump according to claim 19, wherein the motor windings are encapsulated in a potting material and the infrared sensor is mounted in said potting material.

21. A turbomolecular vacuum pump according to claim 19, wherein the the surface of the rotor comprises a surface of at least one of a turbomolecular rotor blade, a rotor shaft and a molecular drag pump rotor.

22. The turbomolecular pump according to claim 21, wherein the surface of the rotor comprises a carbon fibre reinforced sleeve.

23. The turbomolecular pump according to claim 15, wherein the heater comprises a motor for rotating the rotor.

24. A motor for rotating a rotor, the motor comprising motor windings encapsulated in a potting material and an infrared sensor system for measuring thermal radiation emitted from a surface of the rotor, the infrared sensor system comprising an infrared sensor and a heater located proximate to the infrared sensor for heating the infrared sensor, wherein the infrared sensor is mounted in said potting material.

25. A motor for rotating a rotor, the motor comprising motor windings and an infrared sensor system for measuring thermal radiation emitted from a surface of the rotor, the infrared sensor system comprising an infrared sensor that is heated by the motor windings.

* * * * *